Feb. 17, 1959 T. J. SCUITTO 2,874,216

AUTOMATIC SIGNAL CONTROL SYSTEM

Filed Oct. 27, 1953 3 Sheets-Sheet 1

Inventor:
Thomas J. Scuitto,
by Charles M. Hutchins
His Attorney.

AUTOMATIC SIGNAL CONTROL SYSTEM

Filed Oct. 27, 1953 3 Sheets-Sheet 2

Inventor:
Thomas J. Scuitto,
by Charles M. Hutchins
His Attorney.

AUTOMATIC SIGNAL CONTROL SYSTEM

Filed Oct. 27, 1953 3 Sheets-Sheet 3

Inventor:
Thomas J. Scuitto,
by Charles M. Hutchins
His Attorney.

United States Patent Office 2,874,216

Patented Feb. 17, 1959

2,874,216

AUTOMATIC SIGNAL CONTROL SYSTEM

Thomas J. Scuitto, Syracuse, N. Y., assignor to General Electric Company, a corporation of New York Application October 27, 1953, Serial No. 388,527

6 Claims. (Cl. 178—66)

The present invention relates generally to electrical control systems and particularly to the type used for automatically controlling the operating frequency of a signalling system.

In signalling systems of the type involving signal modulation of one or more electrical wave characteristics such as amplitude, frequency, phase, time occurrence, shape, etc., a need often arises for accurately converting the signal information to the proper modulation, and for maintaining this accuracy despite electrical circuit irregularities such as temperature effects, aging of circuit parameter, voltage instabilities, etc. To accomplish the latter, it is common practice to employ a control circuit for detecting the irregularity or instability as reflected in an undesirable variation of the electrical wave characteristic, and for correcting this variation at the wave source in accordance with its detected magnitude. Most prior art arrangements employing this technique have required complicated and expensive circuits in order to achieve prompt and accurate corrective action. Oftentimes this corrective action is attainable only over a limited range of circuit malfunctioning.

Accordingly it is an object of this invention to provide an improved electrical control system.

Another object of this invention is to provide a novel automatic frequency control arrangement for use with a frequency modulation system.

Another object of this invention is to provide a novel arrangement for automatically controlling a modulation characteristic of an electrical signal modulation system.

Another object of this invention is to provide a novel arrangement for detecting and correcting an electrical circuit instability in a wave source.

A further object of this invention is to provide improved automatic frequency control of a pulse code modulation system.

In accordance with a preferred embodiment of this invention, an automatic frequency control arrangement is provided for insuring proper frequency modulation of a subcarrier frequency wave by digital information. Briefly, the automatic frequency control is effected by comparing the frequency-modulated output with a reference frequency, and then converting the resultant compared output to a corresponding amplitude modulation. The amplitude modulation is detected and then employed to control a frequency-determining element in the subcarrier wave source. Because of the pulsed nature of the signalling involved, the latter is accomplished by modifying the electrical charge in a frequency determining storage circuit in accordance with the amount that the frequency of the subcarrier wave source departs from its prescribed value.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings, in which:

In the following description of a pulse code modulation system embodying the invention, certain frequency values or timing intervals are assigned at various portions of the system in order to facilitate an understanding of its operation. It is to be understood, however, that such assignments are employed purely by way of example and are not to be construed in any way as limiting the scope of the invention.

Figure 1:
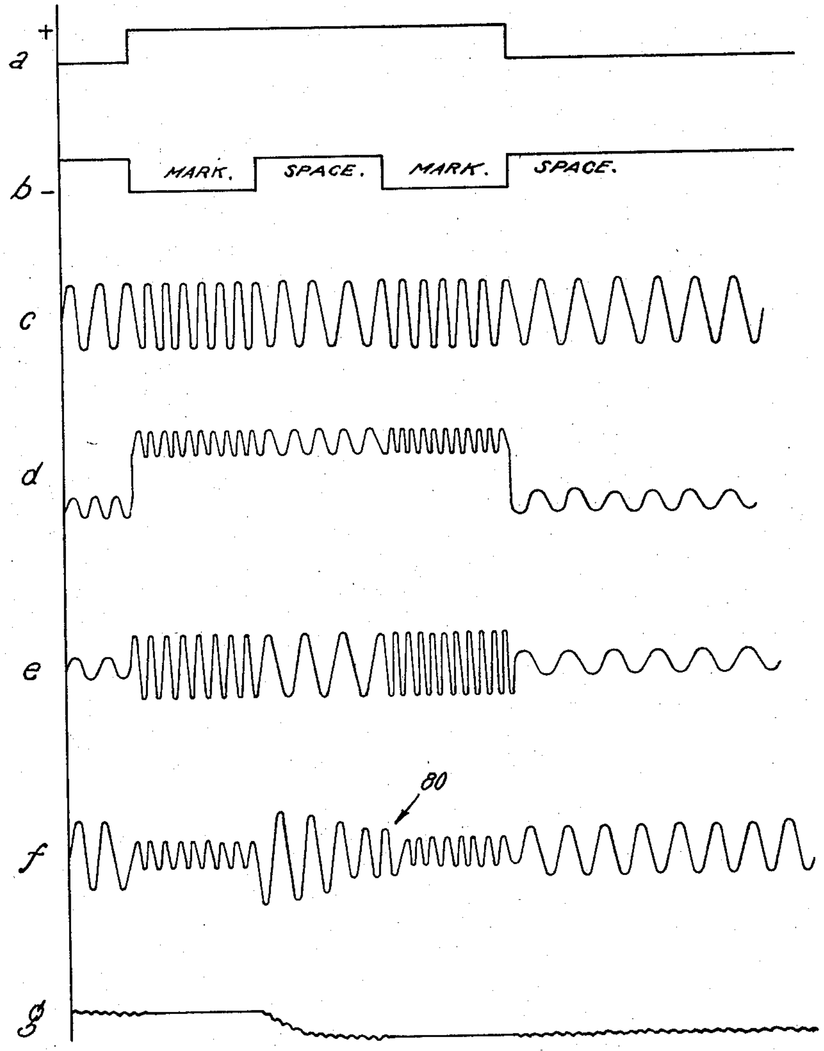
Fig. 1 is a group of wave forms useful in explaining the operation of the systems shown in Figs. 2 and 3.

Reference is now made to Fig. 1, showing a group of coded pulses, whose coding, i. e., the relative occurrence of whose mark and space portions contains the message information. For purposes of simplicity, a message is shown to consist of three digit periods, i. e., in the particular message of Fig. 1*b*, a mark, space and mark interval followed by a blank interval which may for purposes of discussion be considered to be two digit periods long. By transmitting a plurality of such code groups, each containing a discrete message, we achieve a signalling system of the type commonly referred to as involving pulse code modulation. To facilitate the decoding of a pulse coded message, such as 1*b*, at a remote receiver, synchronizing pulses 1*a* are provided, having a duration equal to that of the coded pulse group and occurring simultaneously therewith.

To effect signalling to a remote receiver, the digital, or pulse code modulation of Fig. 1*b* is converted to a frequency modulation of subcarrier oscillations as shown in Fig. 1*c*, which in turn is amplitude-modulated by the synchronizing pulses to yield the waves of Fig. 1*e*. In a preferred embodiment this is accomplished by frequency shift keying of the subcarrier waves in accordance with the mark or space portions of the code group.

In this same embodiment, the digit periods, i. e., the mark or space periods, were 40 milliseconds long, and the subcarrier frequencies for the mark and space periods were 7800 and 7700 cycles per second respectively. Transmission of the message in frequency shift modulation form to a utilization device can be accomplished by any conventional form, wire, radio, etc.

Figure 2:
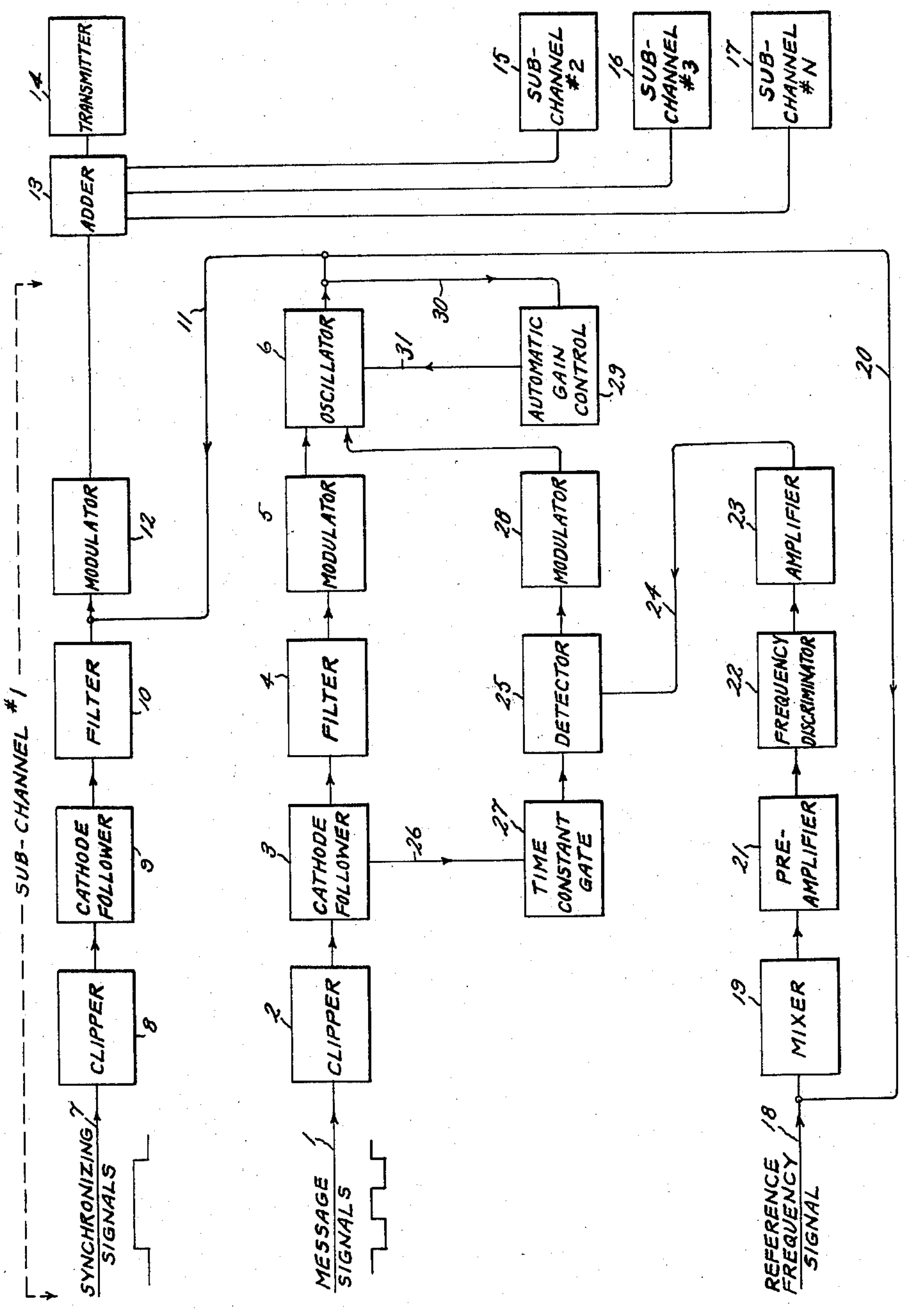
Fig. 2 is a block diagram of an automatic frequency control arrangement for use with pulse code modulated signalling systems.

An arrangement for accomplishing the frequency shift modulation is shown in block diagram form in Fig. 2. The pulse code group, corresponding to Fig. 1*b*, is applied over lead 1 to clipper 2 where the mark and space amplitude levels are standardized. Then the code group is applied through a cathode follower circuit 3 to a filter 4 where the harmonic content of the pulse code group waveform is reduced by shaping. The properly shaped code group is then applied to modulator 5 which effects frequency modulation of the oscillator 6 in accordance with the mark or space content of the pulse code group to derive at the output of oscillator 6 the frequency-modulated waveform of Fig. 1*c*.

In a similar manner the synchronizing signals 1*a*, available over lead 7 are passed successively through a clipper 8, a cathode follower circuit 9, and filter 10 which serve the same purpose as the corresponding elements 1, 3, and 4. The frequency-modulated output of oscillator 6 is applied over lead 11 to modulator 12 for amplitude modulation by the shaped synchronizing signals available from filter 10. The resultant composite waveform shown as Fig. 1*e* is then applied through the adder circuit 13 to any form of transmitter 14 suitable for transmitting the message to a remote receiver.

In a particular embodiment of the invention, the previously described amplitude and frequency modulation system formed only one sub-channel of a frequency multiplex communication system. As shown in Fig. 2, additional sub-channels 15, 16 17 are provided for transmitting other similar messages through the adder circuit 13 over the common transmitter 14 to one or more receivers. For the frequency multiplex system to function properly, the messages from each of the sub-channels are made available as a combined amplitude and frequency modulation of different frequency carrier or subcarrier waves. Thus where sub-channel #1 was operated at 7800 and 7700 cycles per second, channel number 2 was operated at 8200 and 8300 cycles per second, etc. All of these combined amplitude and frequency-modulated subcarriers, which may occur randomly with respect to one another, are then employed to amplitude modulate the carrier waves of a source available in transmitter 14 before transmission to the remote receivers.

It is desirable from the standpoint of bandwidth conservation, that the subcarrier waves for each of the sub-channels be as close together as possible. In order to make this possible, it becomes necessary to provide adequate frequency control of each of the frequency modulation systems. Obviously any irregularities in the behavior of these circuits, due to temperature effects, aging of components, voltage effects, etc. are capable of shifting the normal oscillator operating frequency to cause interference between sub-channels. This would immediately destroy the message-handling effectiveness of the composite system.

In order adequately to stabilize each frequency modulation operation, applicant provides a reference signal of fixed frequency from an extremely stable source, such as a crystal controlled oscillator. This reference signal is applied over lead 18 to mixer circuit 19 together with the frequency-modulated output of oscillator 6 available over lead 20. The difference sideband, still a frequency-modulated output, resulting from said mixing, is applied through preamplifier 21 to the frequency discriminator 22 where the frequency modulated output is converted to an amplitude modulated output. The amplitude modulated output is amplified in 23 and applied over lead 24 to detector 25.

Since the oscillator operates at two different frequencies, depending on whether a mark or space signal appears, from a practical standpoint, it is necessary to repeatedly sample only one of the operating frequencies to determine whether there has been any undesirable change in operating frequency. Accordingly, in the present embodiment, the clipped pulse code group available from cathode follower 3 is applied over lead 26 through the time constant gate 27 to detector 25 to cause the detector to effectively sample only the amplitude-modulated output from amplifier 23 corresponding to the space portion of the pulse code group. This sampled output is then applied to modulator 28 for adjusting the operating frequency of oscillator 6 in the right direction to correct any undesirable frequency shift due to circuit irregularities.

An automatic gain control circuit 29 is provided for controlling the amplitude of the oscillations generated by 6. Circuit 29 receives a portion of the output of oscillator 6 available on lead 30 and converts it to a unidirectional control voltage having an amplitude related to that of the output oscillations from 6. This control voltage is applied over lead 31 to oscillator 6 in a manner to maintain a constant amplitude of oscillations at its output.

Figure 3:
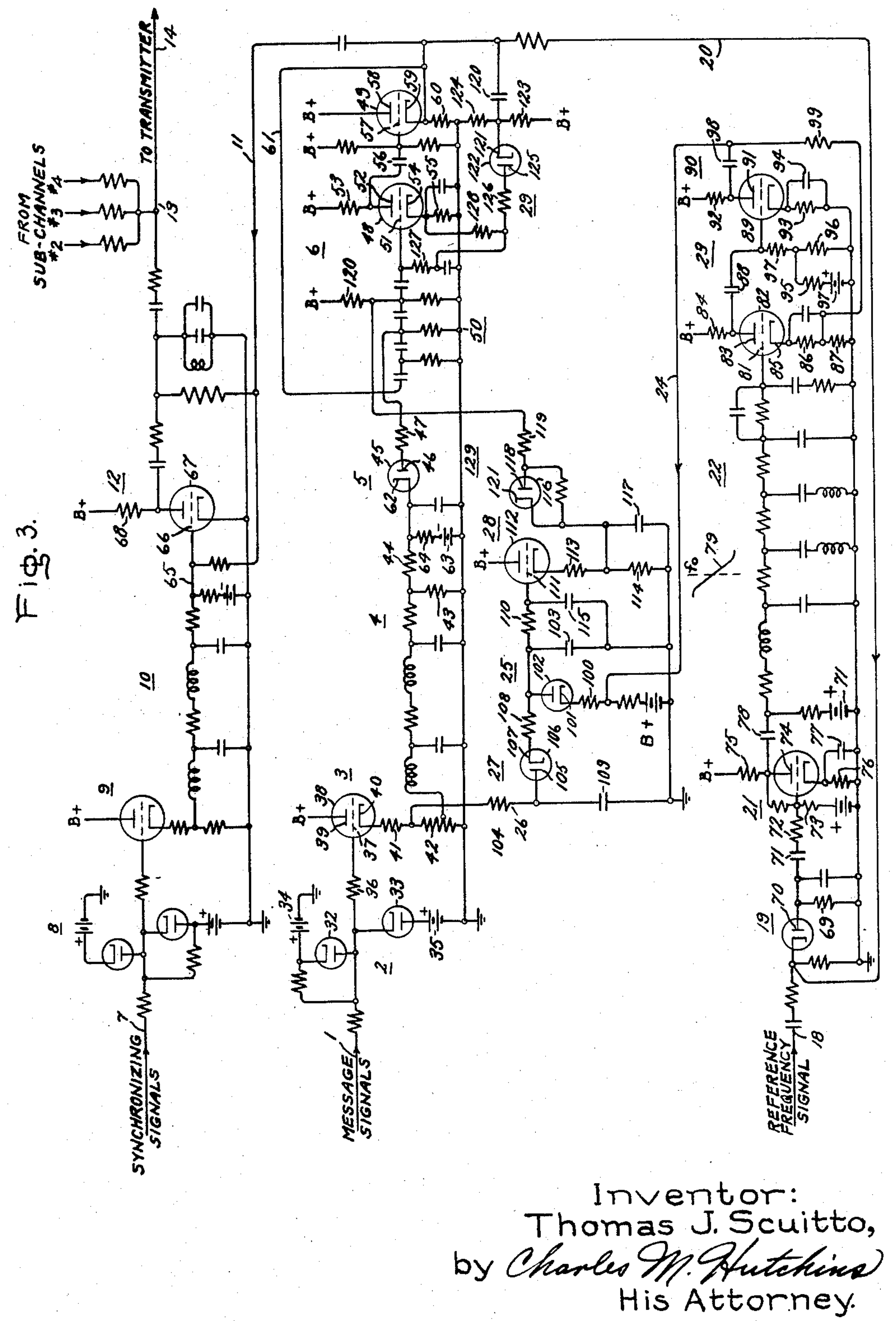
Fig. 3 is a detailed circuit diagram of certain portions of the arrangement of Fig. 2.

Reference is now made to Fig. 3 for a more detailed description of the operation of specific parts of the invention. For purposes of simplicity the reference numerals employed in Fig. 2 are repeated for similar components in Fig. 3.

The pulse code group of Fig. 1*b* available on lead 1 is clipped by diodes 32 and 33 having their anode to cathode circuits connected in reverse polarity to corresponding positive voltage sources 34 and 35. Thus when a negative going mark pulse arrives, diode 32 is rendered non-conductive while diode 33 conducts to clamp the negative excursion of the mark pulse to the voltage of source 35 which in a particular embodiment was about 65 volts. When a positive going space pulse arrives, the diode 33 is rendered non-conductive while diode 32 conducts to clamp the positive going excursion of the space pulse to the voltage of source 34, which in a particular embodiment was about 100 volts. Thus, in effect, a reshaped pulse code group, having standardized positive and negative excursions is made available over resistor 36 at the control grid 37 of triode 38. Triode 38 operates as a cathode follower with its anode 39 connected to B+ and its cathode 40 connected through load resistors 41 and 42 to ground. The clamped pulse code group available at the tapped portion of resistor 42 without any change in polarity, is applied through the wave filter 4 comprising resistors, condensers, and inductances dimensioned to reshape the pulse code group and thereby reduce the harmonic content of the message.

The reshaped pulse code group available at the output of filter 4 across resistor 43 is applied over resistor 44 to the cathode of a diode 45 operating as a modulator. Diode 45 has its anode 46 connected through resistor 47 to the oscillator 6 and forms part of the frequency determining circuit within the oscillator. Oscillator 6 comprises two triodes 48 and 49. Triode 48 operating as an amplifier and triode 49 operating as a cathode follower feedback circuit to cause the overall circuit to oscillate. Triode 48 has a frequency determining, phase shift input circuit 50 in the form of resistors, and condensers connected to its grid 51. Its anode 52 is connected through resistor 53 to B+ and its cathode 54 connected to ground through resistor 55. Any output available at anode 52 is coupled over condenser 56 to the control grid 57 of triode 49. With its anode 58 connected directly to B+ and its cathode 59 connected to ground through resistor 60, triode 49 operates as a regenerative feedback circuit to apply the amplified signal available from triode 48 in proper phase over lead 61 to the input circuit 50, and hence to the grid 51 to cause triode 48 to oscillate. The triode 48 will oscillate at a frequency determined primarily by the dimensioning of resistors and condensers of circuit 50.

Diode 45 is connected by resistor 47 across a portion of the frequency determining input circuit 50, and if caused to change its percentage of conduction time alters the normal operating frequency of oscillator 6. Diode 45 has its cathode 62 biased by the direct voltage source 63 through resistor 64 sufficiently negative so that in the absence of any positive going mark pulses, that is with either a space pulse within the message period, or the absence of any pulses between messages, the diode conducts, say, 50% of the time causing resistor 47 to have an effective resistance twice its normal value. Under this condition resistor 47 forms part of the frequency determining input circuit of oscillator 6 and causes the oscillator to operate at given frequency, for example 7700 cycles per second. Now, when a positive going mark pulse arrives at the cathode 62, it causes diode 45 to conduct more than 50% of the time, so that the effective resistance of resistor 47 due to conduction is decreased in the frequency determining circuit 50. This causes the oscillator 6 now to shift its operating frequency to another value, say 7800. Thus a resultant waveform, Fig. 1*c*, due to frequency shift modulation of oscillator 6 with the pulse code groups of Fig. 1*b* is made available at the cathode of triode 49.

This modulated output is applied over lead 11 to the grid of the synchronizing pulse modulator 12 for mixing with the synchronizing pulses arriving over lead 65. The synchronizing pulses are processed in the clipper stage 8, the cathode follower stage 9 and filter 10 in essentially the same manner as the pulse code group was processed in its corresponding stages 2, 3, and 4. The combined waveforms at grid 66 are as shown in Fig. 1*d*. The modulator 12 comprises a triode 67 with its anode connected to B+ through resistor 68 and its cathode connected to ground. After mixing in triode 67 the composite waveform, shown in Fig. 1*e* is applied through adder 13 to the transmitter along with the corresponding waveforms from the remaining channels as described in connection with Fig. 2.

To provide automatic frequency control for oscillator 6, a stable reference frequency signal is made available over lead 18 as a comparison standard. The frequency shift modulated output is applied over lead 20 to the cathode of diode 19 operating as a mixer together with the reference frequency signal. After mixing in diode 19 the resultant mixed output comprising an upper and lower sideband are developed across resistor 69 connected between the anode 70 and ground. In the particular embodiment previously mentioned, wherein the oscillator 6 had its frequency shifted from 7800 to 7700 cycles per second for the mark and space periods of the pulse code group, the reference frequency was selected to be 7000 cycles per second. Thus sidebands of 800, 700 and 14,800, 14,700 would be developed across resistor 69. The mixed output is then applied through a condenser 71 and a resistor 72 to the control grid 73 of amplifier 21 operating as an amplifier. Amplifier 21 has its anode 74 connected to B+ through resistor 75 and its cathode connected through resistor 76 to ground. Condenser 77 acts to bypass the modulation frequencies to ground. The amplified mixed signals available at anode 74 are applied over condenser 78 to the tuned circuit 22 operating as a frequency discriminator. The resistors, condensers, and inductances of discriminator 22 are dimensioned to provide a substantially sloping amplitude characteristic centered on a prescribed operating frequency. This is illustrated graphically by the characteristic curve 79 wherein frequency is plotted as abscissa and amplitude as ordinate. Referring again to the selected values of the preferred embodiment, the $f_0$ frequency point would correspond to the particular frequency of oscillator 6 to be compared with the reference frequency signal, namely the 700 cycle component of the mixed signal output which corresponds to a space signal. The discriminator was dimensioned so that the $f_0$ frequency point would fall within a substantially linear region of the response characteristic 79 to provide proportional control of the frequency of oscillator 6. Thus when oscillator 6 is operating at normal frequency, corresponding to $f_0$, discriminator 22 delivers an output wave of given amplitude. If the oscillator frequency drifts upward in frequency, discriminator 22 delivers a smaller amplitude output wave, while if the oscillator frequency drifts downward, discriminator 22 delivers a larger amplitude output wave. In effect therefore, discriminator 22 converts the frequency modulation of a selected sideband of the mixed signals, in the present case, the lower sideband, to amplitude modulation. The resultant waveform is as shown in Fig. 1*f*. It should be noted that the discriminator suppressed the amplitude of the mark portions of the mixed signals relative to that of the space signals. Also, at 80, there is shown the decrease in amplitude of the space portion of the signal, due to a gradual drift upward in the frequency of oscillator 6, due to some circuit irregularity. It should be noted that the system responds quickly to provide an amplitude variation in the mixed output signals in accordance with the extent that the frequency of oscillator 6 departs from a normally prescribed value. The amplitude modulated output from discriminator 22 is applied to the control grid 81 of triode 82 forming the first portion of a dual amplifier stage 23. Triode 82 has its anode 83 connected to B+ through resistor 84 and its cathode 85 connected through resistors 86 and 87 to ground. The amplified amplitude modulated output available at anode 83 is applied over condenser 88 to the control grid 89 of the second amplifier stage 90. Amplifier 90 has its anode 91 connected to B+ through resistor 92 and its cathode connected through resistor 93 to ground. Condenser 94 serves to bypass the alternating currents to ground. Resistors 95, 96 and 97 together with the positive voltage source 97 to establish the operating bias for stage 90. An amplified, amplitude modulated output is made available at anode 91. A portion of this output is applied over condenser 98 to the cathode 85 of 82 through resistor 99 as negative feedback to improve the stability of the dual amplifier stage 23. The major portion of the amplified amplitude modulated output is applied over condenser 98, lead 24 and resistor 100 to the cathode 101 of diode 102 acting as an amplitude detector. Since the amplitude modulated output available over lead 24 still contains amplitude modulation components for the mark intervals of the pulse code group, means must be provided for sampling only the space intervals of the message since only these intervals carry any information of the proper operating condition of the oscillator 6. Once the space portions of the waves available over lead 24 have been properly sampled and detected, they can then be employed to control the frequency of oscillator 6 to automatically overcome any undesirable drift in its operating frequency.

In accordance with a preferred embodiment of the invention, this sampling, detection and control is effected in the following manner. An electrical storage circuit, in the form of condenser 103 is provided, whose instantaneous charge is employed to control the value of a frequency determining element of oscillator 6. Condenser 103 is arranged to carry a normal, predetermined charge when the oscillator 6 is operating at its prescribed frequency. During each space interval of a pulse code group, or during the interval between pulse code groups, the charge on condenser 103 is depleted or replenished in accordance with whether the oscillator frequency drifts undesirably downward or upward. The change in charge on condenser 103 then controls the value of the frequency determining element of oscillator 6 to correct the frequency in the proper direction.

Referring again to Fig. 3, whenever a negative-going mark signal appears on the grid of triode 38, a corresponding negative-going voltage is developed across resistors 41 and 42 in its cathode circuit. This negative-going voltage is picked off at the junction of resistors 41 and 42 and applied over resistor 104 to the anode 105 of diode 106. Since diode 106 has its cathode 107 connected through resistor 108 and condenser 103 to ground, this negative-going voltage prevents diode 106 from conducting. Thus condenser 103 is unaffected by the mark, intervals of the message. When a positive-going space signal is applied to grid 37, triode 38 conducts more heavily, resulting in a positive-going voltage being developed at the junction of resistors 41 and 42. This positive-going voltage is of sufficient amplitude to cause diode 106 to conduct and charge condenser 103 to a predetermined positive voltage. Resistor 104 and condenser 109 help to properly shape the charging current wave supplied to condenser 103 during the space message period.

The above discussion had neglected for the time being a discussion of the effect of diode, 102 on the condenser charge. Considering the effect of this diode, now, it is seen that when diode 106 is rendered non conductive by the negative-going mark signals developed at its anode 105, the mark signals of the amplitude-modulated waves (Fig. 1*f*) available over lead 24 are of insufficient amplitude to cause diode 102 to conduct also. Thus the charge on condenser 103 remains unaffected during the mark portions of a message.

However, when a positive-going space signal appears over lead 24 its amplitude during the negative going peak portions is sufficient to cause diode 102 to conduct and alter the charge on condenser 103. The circuit parameters of these charging circuits are dimensioned so that during normal operation of oscillator 6, diodes 102 and 106 both conduct to provide what may be termed a normal charge on condenser 103. It should be noted that diode 106, alone, is arranged to provide a positive voltage, of fixed amplitude during the space period to charge up condenser 103 to a higher positive level than the normal charge level, whereas diode 102, alone, is arranged to provide negative voltage peaks of variable amplitude during the space period which may be positive or negative relative to the normal charge level. When the oscillator 6 operates properly, the negative-going voltage peaks passed by diode 102 are of proper amplitude to establish the normal charge level on condenser 103. A decrease in oscillator frequency, results in larger amplitude negative-going peaks being passed by diode 102 so that the charge on condenser 103 is reduced, whereas if the frequency increases, smaller negative-going peaks are passed by diode 102 so that the charge on condenser 103 rises above the normal level.

The voltage signal on condenser 103, due to its instantaneous charge is applied over resistor 110 to the control grid 111 of triode 112 operating as cathode follower. Triode 112 has its anode connected to B+ and its cathode connected through resistors 113 and 114 to ground. The resistor 110 and condenser 115 in the input circuit to triode 112 serve to attenuate the carrier frequency component, 700 cycles in the preferred embodiment. The voltage signal, indicative of the charge on condenser 103, is developed across resistor 114 connected to the cathode of diode 116 operating as modulator 28. Diode 116 has its cathode connected to ground through resistor 114 and capacitor 117 and its anode 118 connected through resistor 119 to a point in the frequency determining circuit 50 of oscillator 6. Thus diode modulator circuit 28 is effectively placed in parallel with a portion of the circuit 50 and hence is capable of altering the frequency of operation of oscillator 6. Diode 116 has its anode also connected through resistors 119 and 120 to B+ so that it is normally conducting, say, 50% of the time. With the signal voltage applied to its cathode 121 which corresponds to normal operation of oscillator 6, the oscillator operates at its prescribed frequency during any space period of a message, or between messages. If the frequency of oscillator increases, the signal voltage increases in the positive direction, causing the diode 116 to conduct less, thereby increasing the effective resistance and thus causing the oscillator 6 to decrease in frequency to its normal operating value. If the oscillator frequency decreases, undesirably, the signal voltage across condenser 103 decreases in the positive direction, causing diode 116 to conduct more, effectively decreasing the resistance of resistor 119, thus causing the oscillator frequency to be corrected back to its normal value.

In addition to the automatic frequency control provided for oscillator 6, an automatic gain control circuit 29 is employed to maintain a constant amplitude of frequency-modulated signals for the mark and space portions of the pulse-coded message. Its constant amplitude requirement is essential to insure that diode 45 is not amplitude sensitive to the oscillator signals and serves only to alter the frequency of the oscillator 6 in accordance with whether a mark or space signal appears at its cathode 62. Any change in the amplitude of output oscillations available at cathode 59 are applied over coupling condenser 120 to the cathode 121 of rectifying diode 122. Diode 122, with its cathode connected by the resistance 123 to B+ and by resistance 124 to ground, has its anode 125 connected through resistors 126 and 127 to the grid 51 of triode 48. Thus any change in the amplitude of the negative-going portions of the oscillations available at cathode 59 result in an appropriate change in voltage being applied to grid 51 to establish an operating bias sufficient to correct the amplitude deviation. A resistance 128 also applies this bias voltage to the cathode 54 of tube 48 in order to facilitate the starting of oscillator tube 48.

With a system constructed as described, it was found possible to hold the frequency of oscillator 6 to within 7 cycles per second of its prescribed value over an extended period of time with normal room temperature variation and line voltage fluctuations.

It should be noted that while the invention has been described in detail with reference to a particular pulse code modulation system, it is equally applicable to other systems requiring a high degree of control action. For example, the invention may be readily employed to control the operation of a phase modulation system to very close tolerances, or a modulation system involving signals other than of the pulse code type, as for example, pulse time modulated signals, it merely being necessary that signals are available which have a reference characteristic, corresponding to the space signals in the above disclosed embodiment, suitable for initiating control action.

Thus, while particular embodiments of the present invention have been shown and described, it will be obvious to those skilled in the art that changes and modifications may be made without departing from this invention in its broader aspects and therefore the aim in the appended claims is to cover all such changes and modifications as fall within the true spirit and scope of the invention.

What I claim as new and desire to secure by Letters Patent of the United States is:

1. A controlled signaling system comprising a source of sequentially occurring mark and space signals, a source of carrier oscillations, means for varying the frequency of said oscillations in accordance with the time occurrence of said mark or space signals to respectively different predetermined carrier frequencies, means for detecting a variation in the frequency of said carrier oscillations from its predetermined frequency for one of said types of signals, a capacitive storage circuit, first means operative solely during the occurrence of said one signal for charging said circuit in a given direction toward a predetermined value and second means also operative solely during the occurrence of said one signal for charging said circuit in a direction opposite to said given direction in accordance with the value of said detected frequency variation to derive a resultant charge, and means for altering the frequency of said carrier oscillations in accordance with said resultant charge.

2. An automatic frequency control system for an oscillator whose frequency of oscillation is adjusted to two different values in accordance with mark and space signals, comprising a source of reference frequency oscillations, means for mixing the oscillations of said oscillator and reference frequency source to derive oscillations having a frequency equal to the difference of said carrier and reference frequencies, means for varying the amplitude of said difference frequency oscillations in accordance with any shift of said difference frequencies from a prescribed value, means for attenuating portions of the amplitude varied oscillations corresponding to one of the types of signals, a capacitive storage circuit, means for charging said circuit in response to the occurrence of the other type of signal, means for modifying the charge in said circuit in accordance with the amplitude of the portions of said converted amplitude modulated oscillations corresponding to the other type of signal to derive a resultant charge, and means for controlling the frequency of oscillation of said oscillator in accordance with the resultant charge of said circuit.

3. A frequency control system for a source of carrier oscillations whose frequency is varied to different predetermined values in accordance with two correspondingly different, alternately applied modulation signals, comprising means for detecting a variation in the predetermined frequency value of said carrier oscillations for one modulation signal, a capacitive storage circuit, means responsive during each occurrence of said one modulation signal for charging said circuit in a given direction toward a predetermined maximum level, and means for simultaneously charging said circuit in a direction opposite to said given direction in accordance with said detected frequency variation to derive a resultant charge, and means for altering the frequency of said carrier oscillations in accordance with said resultant charge.

4. In combination, a source of carrier oscillations, means for modulating a characteristic of said carrier oscillations in accordance with modulating signals, a source of reference characteristic oscillations, means responsive to said carrier and reference oscillations to provide oscillations having a characteristic corresponding to the difference in the characteristics of said reference and carrier oscillations, means responsive to said characteristic of said provided oscillations for supplying oscillations having a corresponding, different characteristic modulation, a signal storage circuit, means for normally maintaining a given value of signal in said storage circuit, means for modifying the value of said storage signal in accordance with the value of the different characteristic of said last named oscillations corresponding to a predetermined one of said modulating signals to derive a resultant storage signal, and means for altering said characteristic of said carrier source oscillations in accordance with said resultant signal.

5. An arrangement comprising a source of carrier frequency oscillations, means for frequency modulating said oscillations in accordance with sequentially occurring first and second signals, a source of reference frequency oscillations, means for mixing said carrier and reference frequency oscillations to derive difference frequency oscillations, means for converting said difference frequency oscillations to corresponding amplitude-modulated oscillations, a capacitive storage circuit having a predetermined value of charge, means for simultaneously altering the charge in said circuit in a given direction from said predetermined value in response to each first signal only, and in a direction opposite to said given direction in accordance with the amplitude of the first signal portions of said amplitude modulated oscillations to derive a resultant charge, and means for altering the frequency of oscillation of said carrier source in accordance with the resultant charge in said circuit.

6. In combination, a source of sequentially occurring first and second signals, a source of carrier oscillations comprising an oscillator, means for frequency modulating said oscillations in accordance with the time occurrence of said first and second signals to respectively different carrier frequencies, a source of reference oscillations of constant frequency, means for mixing said reference oscillations and the carrier oscillations due to modulation by said first signals to derive resultant oscillations having a frequency equal to the difference of said carrier and reference frequencies, means for providing an amplitude modulation of said resultant oscillations in accordance with any changes in the frequency of said resultant oscillations from a predetermined value, a capacitive storage circuit, means for charging said circuit in a given direction in response to the occurrence and the duration of said first signals, means for charging said circuit in a direction opposite to said given direction in accordance with the amplitude modulation of said resultant oscillations to derive a resultant charge, a serially connected circuit, comprising a diode and resistance, connected between said storage circuit and said oscillator, said diode responsive to the value of charge in said storage circuit to vary the effective resistance of said serially connected circuit, and said oscillator responsive to the variation of said effective resistance for altering the frequency of said carrier oscillations to maintain the frequency of said resultant oscillations constant.

References Cited in the file of this patent

UNITED STATES PATENTS

| | | |
|---|---|---|
| 2,316,017 | Peterson | Apr. 6, 1943 |
| 2,339,851 | Hansell | Jan. 25, 1944 |
| 2,445,409 | Shank | July 20, 1948 |
| 2,468,038 | Clavier | Apr. 26, 1949 |
| 2,474,261 | Leibe et al. | June 28,1949 |
| 2,501,368 | White | Mar. 21, 1950 |
| 2,541,259 | Maggio | Feb. 13, 1951 |